(12) United States Patent  
Mryasov et al.

(10) Patent No.: US 7,929,239 B2  
(45) Date of Patent: Apr. 19, 2011

(54) DATA STORAGE APPARATUS INCLUDING OPTICALLY ACTIVE NANO-PATTERNED MEDIA AND ELECTRIC FIELD ASSISTED RECORDING METHOD

(75) Inventors: Oleg N. Mryasov, Bradford Woods, PA (US); Ibrahim Kursat Sendur, Framingham, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 1137 days.

(21) Appl. No.: 11/640,708

(22) Filed: Dec. 18, 2006

(65) Prior Publication Data

US 2008/0144206 A1 Jun. 19, 2008

(51) Int. Cl.
*G11B 5/02* (2006.01)
*G11B 5/66* (2006.01)

(52) U.S. Cl. .......................... 360/59; 428/820; 428/822

(58) Field of Classification Search .................. None
See application file for complete search history.

(56) References Cited

U.S. PATENT DOCUMENTS

| 4,417,290 | A | * | 11/1983 | Tanaka et al. ................. 360/131 |
| 4,702,558 | A | | 10/1987 | Coles et al. |
| 4,818,072 | A | | 4/1989 | Mohebban |
| 4,852,075 | A | | 7/1989 | Feyrer et al. |
| 4,995,705 | A | | 2/1991 | Yoshinaga et al. |
| 5,444,651 | A | | 8/1995 | Yamamoto et al. |
| 6,876,425 | B2 | | 4/2005 | Yoo et al. |
| 7,068,452 | B2 | * | 6/2006 | Ogawa et al. ................... 360/55 |
| 2001/0051287 | A1 | * | 12/2001 | Kikitsu et al. ......... 428/694 ML |
| 2004/0240327 | A1 | * | 12/2004 | Sendur et al. ............. 369/13.35 |
| 2006/0044661 | A1 | | 3/2006 | Ogawa et al. |
| 2007/0115762 | A1 | * | 5/2007 | Wisnudel et al. .......... 369/13.56 |

FOREIGN PATENT DOCUMENTS

| JP | 8-136902 A | 5/1996 |
| JP | 8136902 A | 5/1996 |
| JP | 2001291277 A | 10/2001 |

OTHER PUBLICATIONS

J. Müller et al., "Electrically Controlled Light Scattering With Single Metal Nanoparticles," Applied Physics Letters, vol. 81, No. 1, Jul. 1, 2002, pp. 171-173.

* cited by examiner

*Primary Examiner* — Daniell L Negrón
(74) *Attorney, Agent, or Firm* — Robert P. Lenart, Esq.; Pietragallo Gordon Alfano Bosick & Raspanti, LLP

(57) ABSTRACT

An apparatus comprises a data storage medium including a magnetic recording element and an optically active material positioned adjacent to the magnetic recording element, an electric field source for applying an electric field to a portion of the data storage medium, a source of electromagnetic radiation for irradiating the data storage medium, and a magnetic field source for applying a magnetic field to the portion of the data storage medium.

14 Claims, 5 Drawing Sheets

DATA STORAGE APPARATUS INCLUDING OPTICALLY ACTIVE NANO-PATTERNED MEDIA AND ELECTRIC FIELD ASSISTED RECORDING METHOD

FIELD OF THE INVENTION

This invention relates to methods and apparatus for data storage, and more particularly to such methods and apparatus that can be used in thermally assisted magnetic recording, probe storage and patterned medium storage.

BACKGROUND OF THE INVENTION

To increase density of the information stored on a magnetic storage media, one has to reduce the spatial distribution of the magnetic field generated by a write element in a recording head. With the conventional magnetic recording approach, one has to rely on the continuous reduction of the write element lateral dimensions; reduction of the head-to-media spacing (HMS); and/or reduction of the media grain size.

This strategy has its fundamental limitations. For example, it leads to a reduction of the write field amplitude and increasing fabrication expenses. It also leads to more complicated overcoat and lubrication solutions.

Thermally assisted magnetic recording (also referred to as heat assisted magnetic recording (HAMR)) has been developed to address instabilities that result from a reduction in grain size. HAMR generally refers to the concept of locally heating a recording medium to reduce the coercivity of the recording medium so that an applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability.

In thermally assisted magnetic recording, information bits are recorded on a storage layer at elevated temperatures, and the heated area in the storage layer determines the data bit dimension. In one approach, a beam of light is condensed to a small optical spot onto the recording media to heat a portion of the media and reduce the magnetic coercivity of the heated portion. Data is then written to the reduced coercivity region.

However, to achieve additional increases in data storage capacities, there remains a need for further reduction in the size of data bits written in the storage media in magnetic recording systems.

SUMMARY OF THE INVENTION

In one aspect, this invention provides an apparatus comprising a data storage medium including a magnetic recording element and an optically active material positioned adjacent to the magnetic recording element, an electric field source for applying an electric field to a portion of the data storage medium, a source of electromagnetic radiation for irradiating the data storage medium, and a magnetic field source for applying a magnetic field to the portion of the data storage medium.

In another aspect, the invention provides a method comprising the steps of providing a data storage medium including a magnetic recording element and an optically active material positioned adjacent to the magnetic recording element, applying an electric field to a portion of the data storage medium, irradiating the data storage medium, and applying a magnetic field to the portion of the data storage medium.

The invention further encompasses a data storage medium comprising an electrically conductive layer, and a recording layer on the electrically conductive layer, wherein the recording layer includes a magnetic recording element and an optically active material positioned adjacent to the magnetic recording element.

DETAILED DESCRIPTION OF THE INVENTION

This invention provides a method and apparatus in which a magnetic media is heated using localized absorption of light rather than localizing a light spot. Heating is used to localize the response of the media to a magnetic field within a magnetic nano-element. The size of the affected area of the media is significantly smaller than the size of the magnetic write pole.

The invention provides a solution to the problem of localizing the response of a data storage media to an applied magnetic write field. The storage media of this invention includes an optically active material that enables spatially localized control of the media properties in the process of recording data. In various aspects, the invention includes optically active nano-patterned bi-layer, or core-shell composite magnetic structure (i.e., magnetic nano-particles including core-shell nano-particles), data storage media and an electric field assisted data recording scheme. The combination of these elements in a data storage device enables the writing of smaller information bits without significant decrease in the write element dimensions and/or the HMS. This can be achieved in an optically active patterned media, the light absorption of which can be controlled by an electric field applied to the media. Electric field assisted recording can be implemented through the combination of laser light, a magnetic write element, and an electrode tip for subjecting the storage media to a DC electric field.

In one example, the apparatus of this invention utilizes an optically active nano-patterned data storage media with electric field dependent light absorption properties. A combination of a light source, a magnetic write element field, and a sharp electrode tip is utilized to provide selective/spatially localized light absorption and switching field control due to a shift in peak light absorption. The dependence of light absorption on the external electric field can be achieved by introducing optically active materials surrounding one or more magnetic dots, or magnetic islands, in the media.

With this invention, requirements on the HMS and spatial dimensions of the magnetic write element, or write pole, can be relaxed. Diffraction limited light spot sizes are acceptable for the apparatus to provide spatially selective writing.

In heat assisted magnetic recording, an electromagnetic wave of, for example, visible, infrared or ultraviolet light is directed onto a surface of a data storage medium to raise the temperature of a localized area of the medium to facilitate switching of the magnetization of the area. This invention limits the size of the heated region of the storage media to reduce the size of data bits stored on the media.

Figure 1:
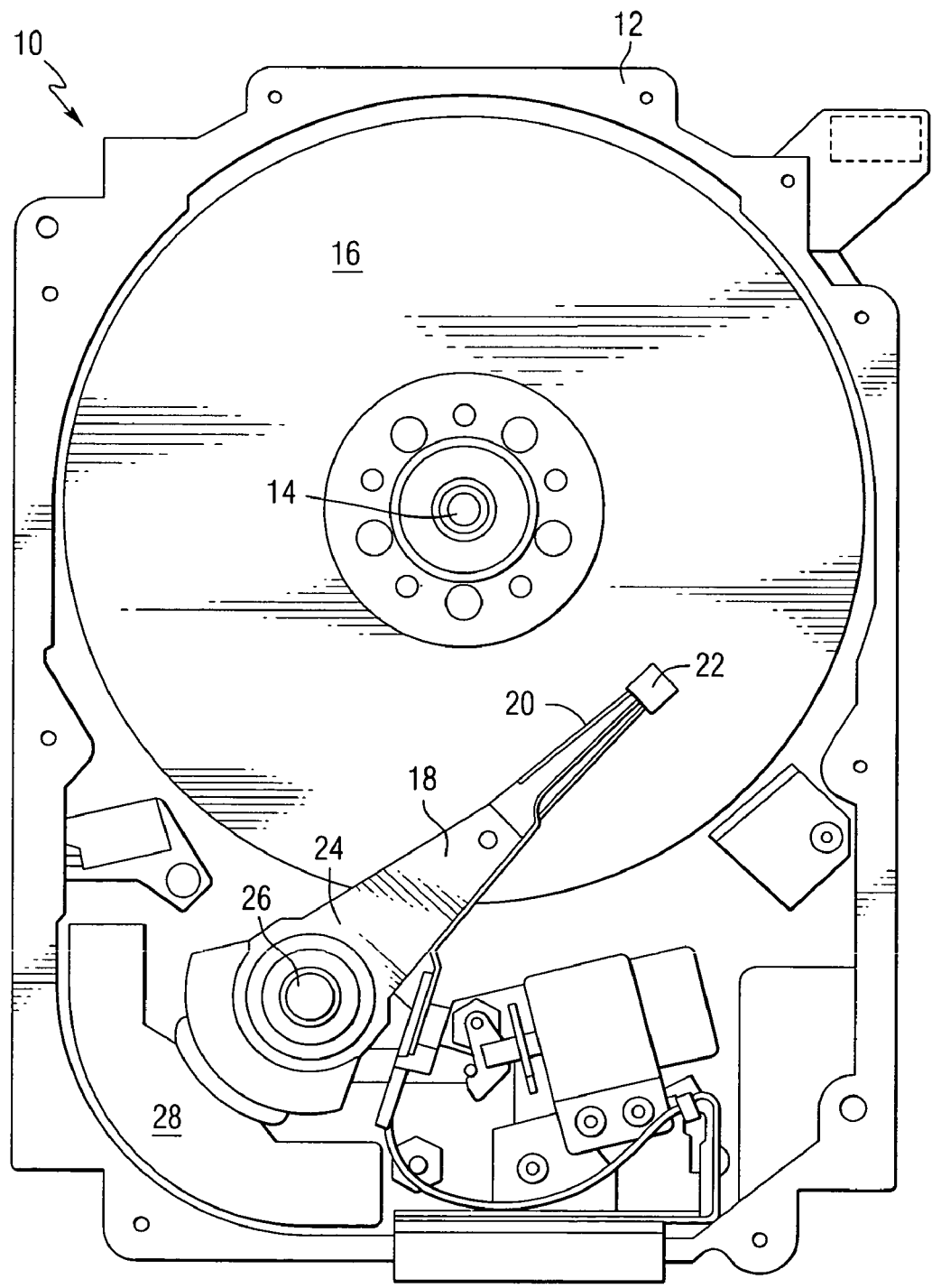
FIG. 1 is a pictorial representation of one possible realization of a data storage device that can include this invention.

FIG. 1 is a pictorial representation of a data storage device in the form of a disc drive 10 that can utilize the invention. The disc drive includes a housing 12, with the upper portion removed and the lower portion visible in this view, sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

While the invention can be used in a disc drive as shown in FIG. 1, it should be understood that the invention is also applicable to other types of data storage devices, such as patterned media, probe storage devices or other devices that use heat assisted magnetic recording.

Figure 2:
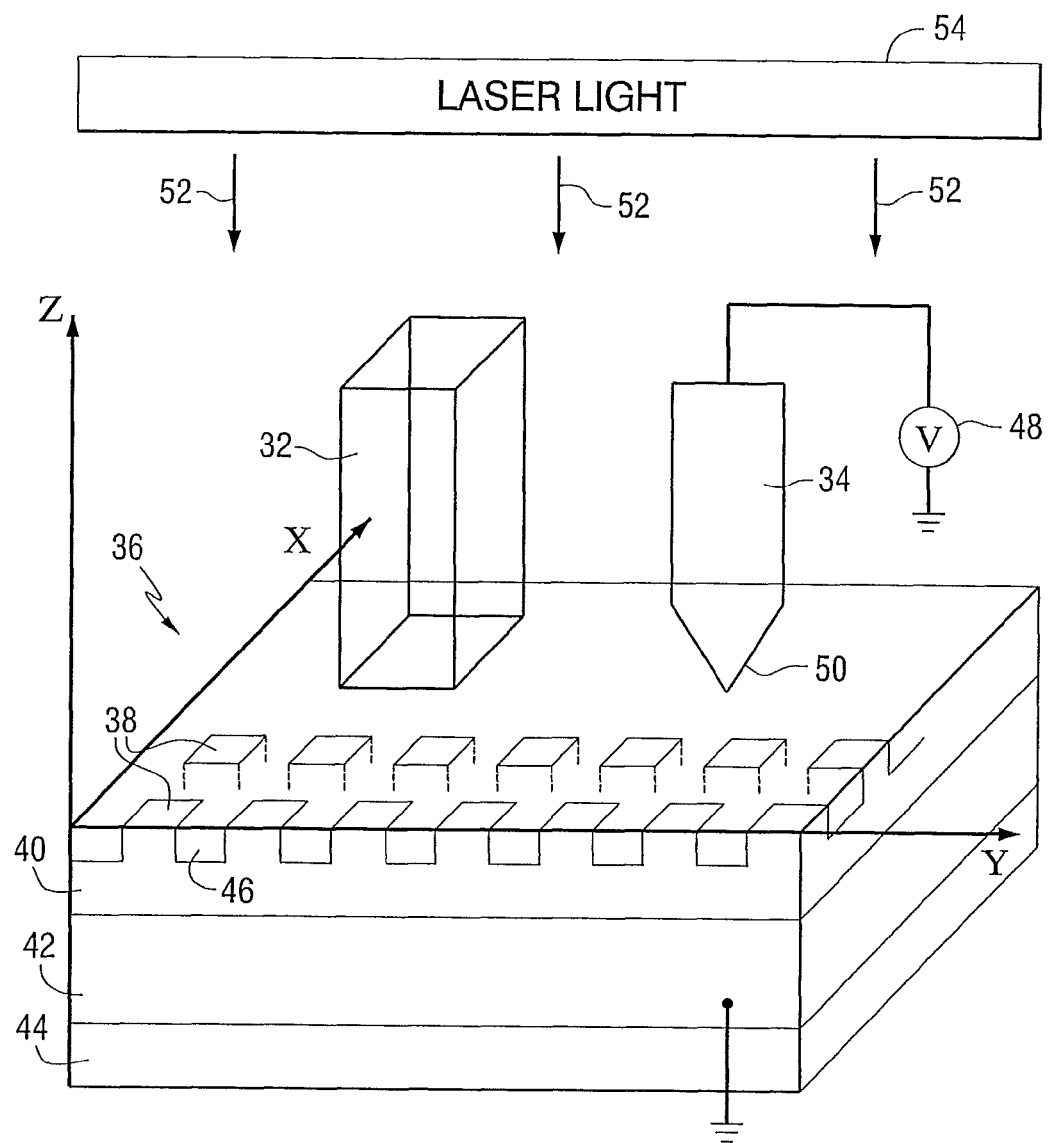
FIG. 2 is a schematic of an apparatus constructed in accordance with an embodiment of the invention.

FIG. 2 is a schematic diagram of portions of a magnetic data storage apparatus constructed in accordance with an embodiment of the invention. The apparatus includes a magnetic write element 32, an electrode 34, and a data storage medium in the form of an optically active patterned media 36 (OAPM). The data storage medium in this example includes a plurality of magnetic recording elements 38 formed in a recording layer 40 that is positioned on an electrically conductive heat sink layer 42. The heat sink layer is positioned on a substrate 44. An optically active material 46 is positioned adjacent to the magnetic recording elements. In this example, the optically active material 46 is positioned between the magnetic recording elements.

A voltage source 48 is electrically connected between the storage media and the electrode 14. The electrode is shaped to form a sharp tip 50. The voltage difference between the electrode and the medium subjects a portion of the medium to an electric field. This electric field increases the optical absorption (or lowers the reflectivity) of the optically active material. Light 52, which can be applied by a source of electromagnetic radiation such as a laser 54, is used to heat a portion of the data storage medium to reduce the coercivity of the magnetic recording elements. Since the portion of the media that is subjected to the electric field will have a lower reflectivity, more light energy is absorbed in that portion, and the temperature of that portion will rise faster than other parts of the media that are exposed to the beam of light.

Figure 3:
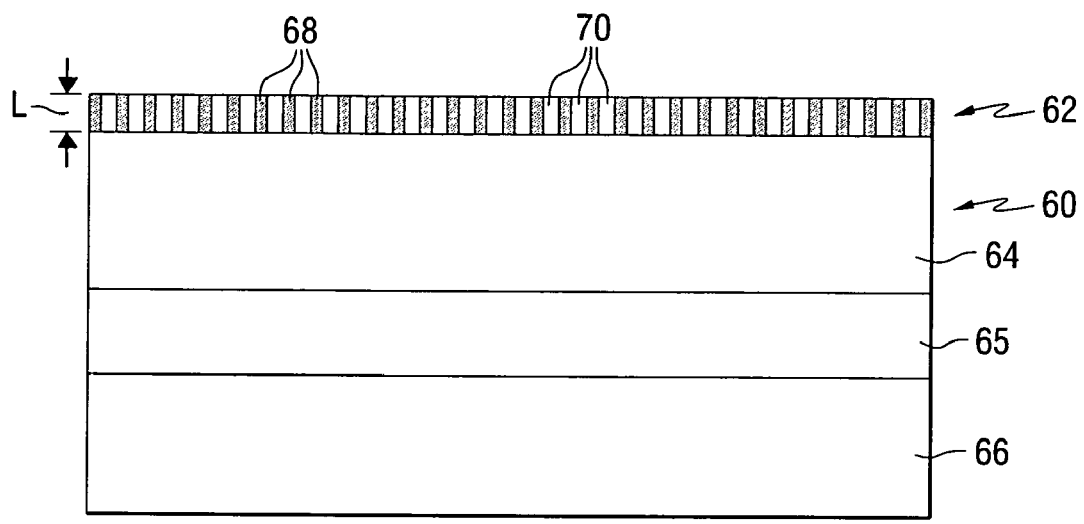
FIG. 3 is a cross-sectional view of a data storage medium constructed in accordance with an embodiment of the invention.

FIG. 3 is a cross-sectional view of a storage media 60 showing a patterned film recording layer 62 on an electrically and thermally conductive heat sink layer 64, which can be, for example, Au, Ag, etc. The heat sink layer is positioned on a soft magnetic underlayer 65, that is positioned on a substrate 66. The soft magnetic underlayer can be constructed of, for example, alloys, layers, or multilayers of Co, Fe, Ni, Pd, Pt or Ru. The recording layer includes a plurality of islands 68, also referred to as magnetic recording elements or magnetic dots, of magnetic recording material. An optically active dielectric filler material 70 is positioned between the recording elements. Other layers can be included in the media. For example, the recording media may include a thin seed layer to provide desired growth texture if it cannot be achieved otherwise.

In the construction of FIG. 3 the spaces between magnetic dots go all the way through the recording layer to the highly optically and thermally conducting underlayer 64. Underlayer 64 can be, for example, gold, silver or aluminum, and is referred to as an optically "soft" underlayer. Underlayer 64 is positioned between the recording elements and the magnetically soft underlayer 65. This construction provides a sharper resonance (e.g., plasmon resonance) than the structure of FIG. 2, wherein the spaces between the magnetic islands go only part of the way through the recording layer. In addition, the construction of FIG. 3 is expected to have preferable heat transport characteristics (e.g., less lateral heat spreading) than construction in FIG. 2. In FIG. 3 we also show a soft magnetic layer designed to provide magnetic field flux closure to allow better localization of the magnetic field spot produced on the media by the write element pole.

Figure 4:
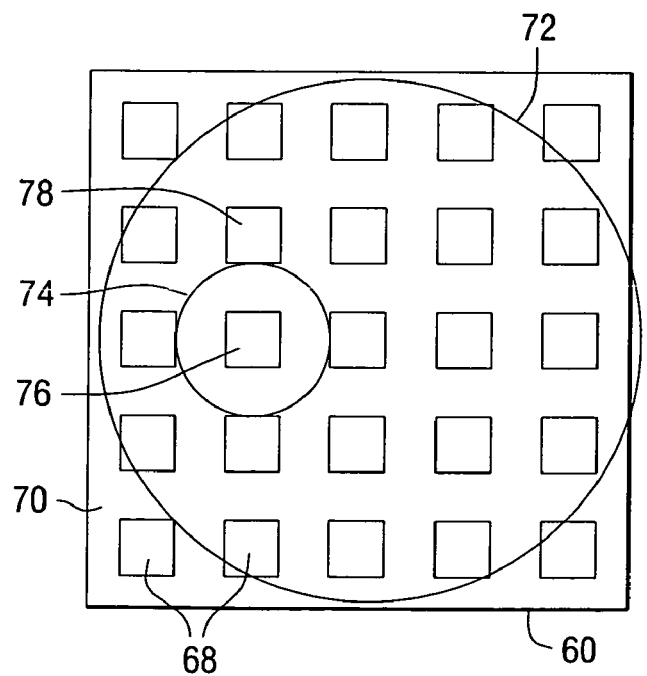
FIG. 4 is a top view of a portion of the data storage medium of FIG. 3.

FIG. 4 is a schematic top view of the storage media 60 that includes a magnetic nano-patterned film recording layer including magnetic islands 68 embedded into optically active material 70 having a large electro-optic constant (also called an electro-optical coefficient). The optically active material can be, for example, a liquid crystal, CdTe, or an oxide such as $LiNbO_3$, $NH_4H_2PO_4$, $KH_2PO_4$, $KD_2PO_4$, $LiNbO_3$, or $LiTaO_3$.

A laser or other source of electromagnetic radiation can be used to direct a beam of light, illustrated by circle 72, onto the surface of the recording media. The electrode 14 and voltage source 48 of FIG. 2 are used to produce an electric field in the region indicated by circle 74. This electric field changes the light absorption properties of the optically active material (for example reduces the reflectivity) such that more of the incident light is absorbed in the region indicated by circle 74, and the temperature of the media in that region rises above the temperature of the media outside of that region. The region indicated by circle 74 is small enough so that the temperature of magnetic recording element 76 is higher than that of its nearest neighbors, such as magnetic recording element 78. Thus the magnetic coercivity of recording element 76 is lower than the magnetic coercivity of recording element 78. When a magnetic write field is applied by a write pole (not shown in this view), the direction of magnetization of the magnetic recording element 74 can be switched, while the magnetization of the magnetic recording element 76 is unaffected. Thus even if the write pole dimensions are such that it applies a magnetic write pole to more than one magnetic recording element, the magnetization of only recording element 76 will be affected, due to its reduced coercivity.

In one example, the invention can use a liquid crystal (LC) as the material for the optically active filling between the magnetic recording elements of the patterned media. The term liquid crystal is used to describe a substance, which is in a state between a liquid and a crystal but exhibits properties similar to both. There are many chemical compounds that can exist in this liquid crystal state. Liquid crystals are found in numerous classes of substances. For example liquid crystals can be polymer materials with strongly anisotropic optical properties.

The properties of liquid crystals allow easy fabrication steps to be added to the nano-patterning process used to make the data storage media, to achieve desirable electro-optical properties. Gold particles in a liquid crystal have been shown by others to demonstrate a significant resonance. Other desirable characteristics of these materials include a large electro-optical coefficient, and compatibility with lubrication requirements. Liquid crystals could have good lubricating properties so they can make the media optically active and also work as a lubricant for moving parts of the device.

The components of the apparatus should be structured and arranged to maximize the difference of the switching field between the magnetic recording element at the center of the electric field spot and its nearest neighbors, referred to as the δT metric. This is addressed through the use of a composite media design combining a layer of a first material having a higher $T_c$ and a higher $K_u$, and a layer of a second material having a lower $T_c$ and a lower $K_u$, where $T_c$ is the Curie temperature and $K_u$ is the magnetic anisotropy. The thickness and difference of $K_u$, $T_c$, and magnetization ($M_s$) of these two layers can be adjusted to allow a maximum switching field variation for a given temperature rise.

Figure 5:
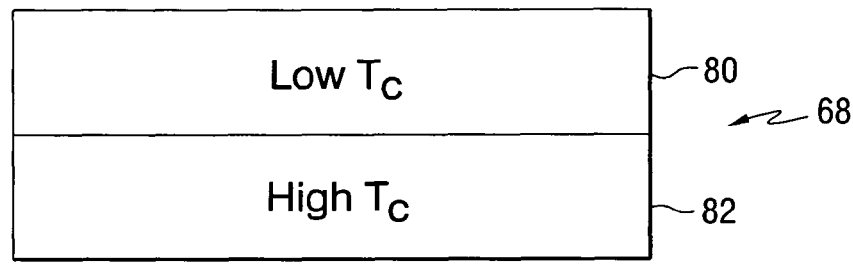
FIG. 5 is a side elevation view of a magnetic recording element of the data storage medium of FIG. 3.

FIG. 5 is a side elevation view of a magnetic recording element 68 of the data storage medium of FIG. 3. The magnetic recording element 68 includes a first layer 80 adjacent to a second layer 82. The layers have different Curie temperatures and may have differences in other magnetic properties, such as the uniaxial anisotropy constant $K_u$, the magnetic saturation $M_s$, and the exchange coupling and thickness t. In this example, the Curie temperature of the top layer 80 is lower than the Curie temperature of the bottom layer 82. The use of a material with a lower Curie temperature on top facilitates switching of the magnetization of the element. However, in another example, the material having the lower Curie temperature could be on the bottom. Additional layers, such as a seed layer, may be included in the structure of FIG. 5. Additional layers are often necessary for desirable growth of magnetic layers.

The structure of FIG. 5 can be achieved by using a ($Co_{1-x}Pt_x$) alloy having a Pt concentration profile across the film, where x=0.75 for the higher $T_c$ material and x=0.25 for the lower $T_c$ material. Alternatively, Co|Pt could be used for the lower $T_c$ material. As used herein, $Co_{1-x}Pt_x$ represents an alloy of cobalt and platinum, and Co|Pt represents a multilayer structure with well-defined boundaries.

In other embodiments, the optimum combination of material properties can be achieved with other materials, for example pure Ni, or other various alloys that include Ni, and other elements.

Calculated light absorption for a moderate or small laser power indicates that for a temperature rise of T=233° K, one can achieve a δT of about 100° K. This temperature difference is found to be sufficient to select a single central bit for a switching event even when head-to-media spacing variations leading to 0.1-0.2 kOe head field fluctuations are taken into account.

Figure 6:
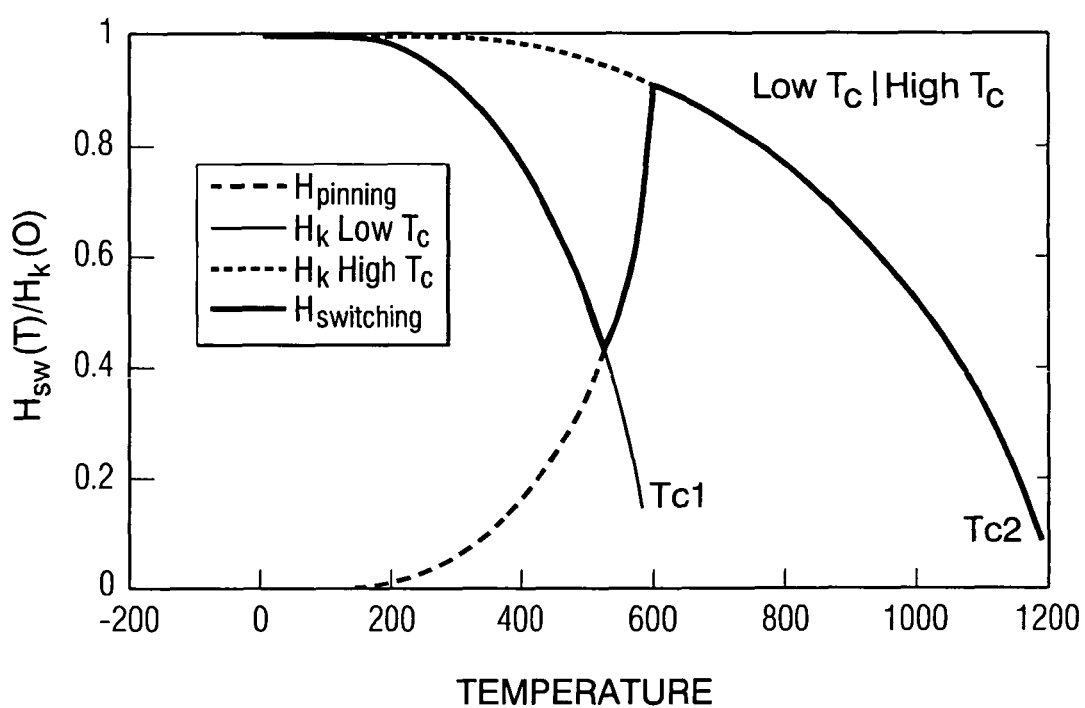
FIG. 6 is a graph of magnetic field versus temperature.

FIG. 6 is an illustration of the switching field dependence on temperature for the low $T_c$/high $T_c$ composite structure of FIG. 5. FIG. 6 illustrates a switching field for a case where uniaxial anisotropy constant, the exchange energy, and the magnetic saturation of the material in layers 80 and 82 are equal, and where layer 82 has a $T_c$ of 1200° K, and layer 80 has a $T_c$ of 600° K. The temperature variation of the switching field can be adjusted by choosing different materials to maximize the effect of δT due to the selective light absorption.

The DC electric field is used to create a variation of the dielectric constant, or refractive index, in the portion of the media that is subjected to the electric field, which is more spatially localized than the magnetic field spot produced by the write pole. The electrode includes a sharp tip to provide a spatially localized distribution of the DC electric field. The optically active material described above will change its light absorption properties as medium is shifted in the area exposed to the electric field.

Figure 7:
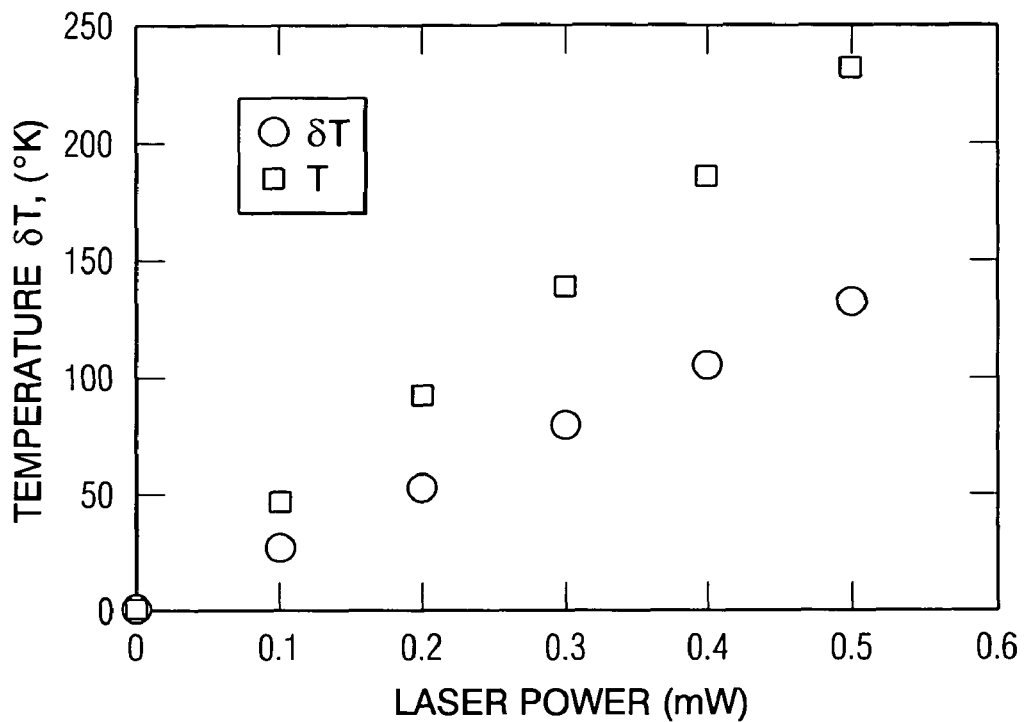
FIG. 7 is a graph of temperature versus laser power.

The effect of this spatially localized variation in the light absorption on the magnetic properties is controlled by the corresponding maximum temperature rise (T) and spatial selectivity of the write scheme, and is characterized by the difference between the temperature of the central bit and the nearest neighbors δT. FIG. 7 shows δT and T as a function of the laser power calculated from the heat transfer equation $$\nabla \cdot (K(\vec{r})\nabla T(\vec{r}, t)) - C(\vec{r})\frac{\partial T(\vec{r}, t)}{\partial t} = Q(\vec{r}, t) \quad (1)$$

where, T [in ° K] is the temperature at a point defined by the vector $\vec{r}$ at the time t, K [in W/(mK)] is the thermal conductivity of the material, C is the volumetric heat capacity of the material, and Q [in W/m³] is the power density of the heat produced by the light source. The vector $\vec{r}$ extends from an origin that is chosen to reduce the complexity of the calculation.

For moderate laser powers and optically active media with LC filling (or other highly optically active material) δT and T can lead to a sufficient temperature rise and spatial localization of the recorded data bits.

FIG. 7 illustrates a figure of merit of the proposed electric field assisted data writing scheme. The maximum temperature rise T and temperature difference between central bit and the nearest neighbors δT=$T_{center}$-$T_{nn}$ was calculated from the solution of the heat transfer differential equation (Equation 1), where $T_{center}$ is the temperature of the magnetic recording element at the center of the electric field distribution, and $T_{nn}$ is the temperature of the nearest neighbor magnetic recording element.

Figure 8:
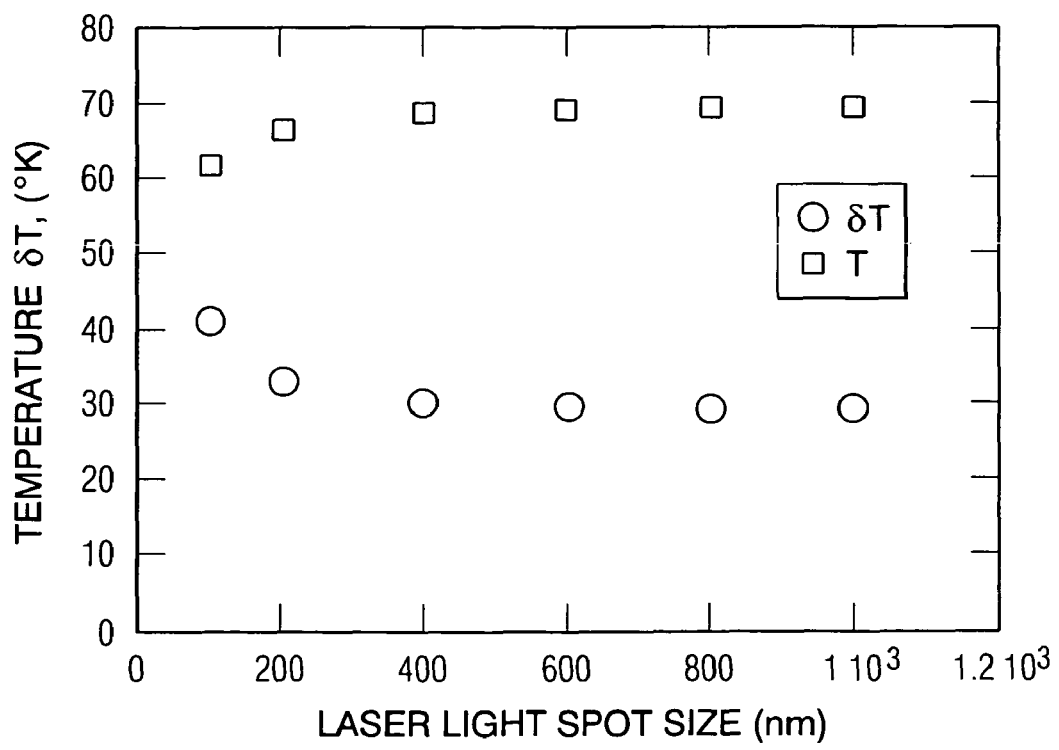
FIG. 8 is a graph of temperature versus laser spot size.

Another important figure of merit for the electric field assisted data writing scheme is the dependence of the δT on the laser light spot size as shown in FIG. 8. FIG. 8 shows a spot size related figure of merit of the proposed electric field assisted data writing scheme for δT=$T_{center}$-$T_{nn}$ as a function of the laser light spot size (nm). The numerical calculations demonstrate that with the DC electric field assisted writing scheme, diffraction limited light spot sizes can be used. The polarity of the applied DC electric field can be changed so that the electrode tip is either positive or negative.

While the invention has been described in terms of several examples, it will be apparent to those skilled in the art that various changes can be made to the described examples without departing from the scope of the invention as set forth in the following claims.

What is claimed is:
1. An apparatus comprising:
 a data storage medium including a magnetic recording element and an optically active material positioned adjacent to the magnetic recording element;
 an electric field source to apply an electric field to a portion of the data storage medium to increase light absorption of a portion of the optically active material;
 a source of electromagnetic radiation to irradiate the portion of the optically active material and raise the temperature of the magnetic recording element; and
 a magnetic field source to apply a magnetic field to the portion of the data storage medium.

2. The apparatus of claim 1, wherein:
the data storage medium includes additional magnetic recording elements and each of the magnetic recording elements comprises a dot of magnetic material; and
the optically active material is positioned adjacent to the dots of magnetic material.

3. The apparatus of claim 1, wherein the magnetic recording element comprises:
an island embedded in the optically active material, the island including a layer of a first magnetic material and a layer of a second magnetic material, wherein the first and second magnetic materials have different Curie temperatures.

4. The apparatus of claim 3, wherein properties of the first and second magnetic materials, including uniaxial anisotropy constant, magnetic saturation, and/or thickness are adjusted to maximize switching field reduction per degree of temperature rise.

5. The apparatus of claim 1, wherein the electric field source comprises:
an electrode; and
a voltage source connected between the electrode and the data storage medium.

6. The apparatus of claim 1, wherein the optically active material comprises:
a liquid crystal, CdTe, or an oxide.

7. The apparatus of claim 1, wherein the storage medium comprises:
a magnetically soft underlayer; and
a thermally conductive layer positioned between the magnetically soft underlayer and the magnetic recording element.

8. A method comprising:
providing a data storage medium including a magnetic recording element and an optically active material positioned adjacent to the magnetic recording element;
applying an electric field to a portion of the data storage medium to increase light absorption of a portion of the optically active material;
irradiating the portion of the optically active material to raise the temperature of the magnetic recording element; and
applying a magnetic field to the portion of the data storage medium.

9. The method of claim 8, wherein:
the data storage medium includes additional magnetic recording elements and each of the magnetic recording elements comprises a dot of magnetic material; and
the optically active material is positioned adjacent to the dots of magnetic material.

10. The method of claim 8, wherein the magnetic recording element comprises:
an island embedded in the optically active material, the island including a layer of a first magnetic material and a layer of a second magnetic material, wherein the first and second magnetic materials have different Curie temperatures.

11. The method of claim 8, wherein properties of the first and second magnetic materials, including uniaxial anisotropy constant, magnetic saturation, and/or thickness are adjusted to maximize switching field reduction per degree of temperature rise.

12. The method of claim 8, wherein the electric field is applied using an electric field source comprising:
an electrode; and
a voltage source connected between the electrode and the data storage medium.

13. The method of claim 8, wherein the optically active material comprises:
a liquid crystal, CdTe, or an oxide.

14. The method of claim 8, wherein the storage medium comprises:
a magnetically soft underlayer; and
a thermally conductive layer positioned between the magnetically soft underlayer and the magnetic recording elements.

* * * * *